(12) United States Patent
Gritti et al.

(10) Patent No.: US 8,215,363 B2
(45) Date of Patent: Jul. 10, 2012

(54) AUTOMATIC MACHINE FOR PRODUCING CORRUGATED SHEET-LIKE ELEMENTS, PARTICULARLY FOR PACKAGING, THERMAL INSULATION, SOUNDPROOFING, AND THE LIKE

(75) Inventors: Fabio Angelo Gritti, Cologno al Serio (IT); Roberto Gritti, Cologno al Serio (IT)

(73) Assignee: Interwave S.R.L., Bergamo (IT)

( * ) Notice: Subject to any disclaimer, the term of this patent is extended or adjusted under 35 U.S.C. 154(b) by 1255 days.

(21) Appl. No.: 10/554,643

(22) PCT Filed: Apr. 23, 2004

(86) PCT No.: PCT/EP2004/004331
§ 371 (c)(1),
(2), (4) Date: Jul. 24, 2009

(87) PCT Pub. No.: WO2004/098867
PCT Pub. Date: Nov. 18, 2004

(65) Prior Publication Data
US 2010/0024967 A1 Feb. 4, 2010

(30) Foreign Application Priority Data
May 8, 2003 (IT) .................................. MI03A0930

(51) Int. Cl.
*B31F 1/29* (2006.01)
*B31F 1/30* (2006.01)

(52) U.S. Cl. .................. 156/469; 156/471; 156/497
(58) Field of Classification Search ........... 156/469–473
See application file for complete search history.

(56) References Cited

U.S. PATENT DOCUMENTS

| 545,354 A | * | 8/1895 | Ferres ........................... 156/473 |
| 2,166,749 A | | 7/1939 | Burrill |
| 2,764,193 A | * | 9/1956 | Knowles ....................... 144/254 |
| 2,926,720 A | * | 3/1960 | Gosman ........................ 156/205 |
| 3,644,159 A | * | 2/1972 | Edkvist ......................... 156/210 |
| 3,904,473 A | | 9/1975 | Warner et al. |
| 3,929,536 A | * | 12/1975 | Maughan ........................ 156/85 |
| 4,262,390 A | | 4/1981 | Einglett et al. |
| 4,356,051 A | * | 10/1982 | Moodie et al. ................ 156/459 |
| 4,874,457 A | | 10/1989 | Swieringa |
| 5,961,778 A | | 10/1999 | Braun et al. |

FOREIGN PATENT DOCUMENTS

| CH | 37 095 A | 4/1907 |
| DE | 556 985 C | 8/1932 |
| DE | 15 61 516 A | 5/1970 |
| FR | 1 373 515 A | 9/1964 |

\* cited by examiner

*Primary Examiner* — John L. Goff
*Assistant Examiner* — Barbara J. Musser
(74) *Attorney, Agent, or Firm* — Modiano & Associati; Albert Josif; Daniel O'Byrne

(57) ABSTRACT

An automatic machine for producing corrugated sheet elements, particularly for packaging, thermal insulation, soundproofing and the like, comprising elements for continuously corrugating a first ribbon that moves longitudinally, a feeder for feeding a second flat ribbon in step with the first ribbon, and a device for joining one another the first and second ribbons in discrete regions.

16 Claims, 10 Drawing Sheets

AUTOMATIC MACHINE FOR PRODUCING CORRUGATED SHEET-LIKE ELEMENTS, PARTICULARLY FOR PACKAGING, THERMAL INSULATION, SOUNDPROOFING, AND THE LIKE

TECHNICAL FIELD

The present invention relates to an automatic machine for producing corrugated sheet-like elements, particularly for packaging, thermal insulation, soundproofing and the like.

BACKGROUND ART

Patent GB 1110287 discloses a sheet made of thermoplastic resin, which is extruded with a corrugated profile and on which corrugations are provided in a direction that is substantially parallel to the extrusion direction.

A substantially flat sheet is connected to the resulting corrugated sheet, for example by lamination; such flat sheet can be made of the most disparate materials and can be obtained for example by means of expanded plastic material.

This embodiment has the drawback of producing a manufactured article that is difficult to store, since the coupled sheet that is provided cannot be rolled up because the corrugations lie substantially parallel to the longitudinal extension of the ribbon.

Because of this problem, the article in this embodiment has not achieved an acceptable diffusion among users, since it was not practically possible to perform industrial-level production.

DISCLOSURE OF THE INVENTION

The aim of the invention is to solve the problem described above, by providing an automatic machine that allows to provide corrugated sheet-like elements automatically, providing a continuous and industrially valid production.

Within this aim, an object of the invention is to provide an automatic machine that allows to continuously connect a corrugated sheet-like element to at least one flat sheet-like element, leading directly to a finished manufactured article that can be stored in relatively limited spaces.

Another object of the present invention is to provide an automatic machine that thanks to its particular constructive characteristics is capable of giving the greatest assurances of reliability and safety in use.

Another object of the present invention is to provide an automatic machine that can be easily obtained starting from commonly commercially available elements and materials and is also competitive from a merely economical standpoint.

This aim and these and other objects that will become better apparent hereinafter are achieved by an automatic machine for producing corrugated sheet-like elements, particularly for packaging, thermal insulation, soundproofing and the like, according to the invention, characterized in that it comprises means for continuously corrugating a first ribbon that moves longitudinally, means for feeding a second flat ribbon in step with said first ribbon, and means for joining one another said first and second ribbons in discrete regions.

BRIEF DESCRIPTION OF THE DRAWINGS

Further characteristics and advantages of the present invention will become better apparent from the description of a preferred but not exclusive embodiment of an automatic machine for producing corrugated sheet-like elements, particularly for packaging, thermal insulation, soundproofing and the like, illustrated by way of non-limiting example in the accompanying drawings, wherein.

WAYS OF CARRYING OUT THE INVENTION

With reference to the figures, the automatic machine for producing corrugated sheet-like elements, particularly for packaging, thermal insulation, soundproofing and the like, comprises a supporting framework, generally designated by the reference numeral 1, which supports means, generally designated by the reference numeral 2, for continuously corrugating a first ribbon.

Said means for continuously corrugating a first ribbon are constituted by a reel 5 for dispensing the first ribbon 3, which is supported so that it can rotate on the supporting framework 1 and feeds a ribbon preferably made of expanded plastic material.

It is also possible to feed a first ribbon and at least one first adjacent ribbon, so as to have a longitudinal separation line on the ribbons 3 that will be corrugated.

The corrugating means 2 are constituted by an upper conveyor, generally designated by the reference numeral 10, and by a lower conveyor 11.

The upper conveyor is constituted by an upper chain 12, which continuously winds around gears 13 that are arranged at the ends and are connected to motor means that determine the type of movement and the speed of the ribbon.

The upper conveyor 10 has a plurality of upper rods or bars 14, which are connected to lateral arms 15 that protrude from coupling blocks 16, which in practice are associated with the links of the chain 12, so as to always lie substantially at right angles to the orientation of the chain.

The upper rods 14 engage the upper face of the first ribbon 3 and move in a longitudinal direction in step with the lower conveyor 11, which has a lower chain 20 that winds around lower gears 21, which are motorized so as to produce synchronous motion between the lower chain 20 and the upper chain 12.

Means for actuating lower rods 24 are connected to the chain 20 and are constituted for example by a plurality of lower cylinders 23, which are arranged at right angles to the extension of the chain 20 and support a plurality of lower rods 24, which are moved along directions that are substantially parallel to the direction of the upper rods 14, so as to be intercalated between said rods.

In greater detail, the lower branch of the upper conveyor 10 in practice intersects the upper branch of the lower conveyor 11, so that the upper rods 14 and the lower rods 24 are mutually alternated and engage mutually opposite sides of the first ribbon 3, which accordingly assumes an undulated shape, for example a sinusoidal shape.

The lower rods 24 have a movement that is perpendicular to the direction of motion of the ribbon for the reasons that will become better apparent hereinafter and in order to be able to disengage from the first ribbon when required.

The machine further comprises an auxiliary chain 25, which moves synchronously with respect to the chain 20 and is arranged on the side of the upper conveyor that lies opposite the side where the cylinders 23 are provided.

The auxiliary chain supports a plurality of guiding elements 26, which are in step with the cylinders 23, in order to support the free end of the lower rods 24 in the extracted position.

The automatic machine further comprises means for feeding 29 a second flat ribbon in step with the first ribbon.

Said feeding means are constituted by a reel 29 for dispensing a second ribbon 30, which is supported by the framework 1 and feeds the ribbon 30 on a coupling roller 31 that is positioned below the upper rods, proximate to the upper branch of the first conveyor.

With this arrangement, the second ribbon 30 is arranged laterally adjacent to the lower face of the first ribbon 3, which has assumed an undulated configuration, so that a series of lower rods 24 remains inserted in the cavities formed between the first ribbon 3 and the second ribbon 30.

Furthermore the machine has joining means that provide the mutual coupling in discrete regions between the first ribbon 3 and the second ribbon 30.

Said joining means, in a preferred embodiment, are constituted by a hot air blower 40, which in practice produces a localized melting of the plastic material that constitutes the first and second ribbons, achieving coupling by contact at the roller 31 over which the second ribbon is passed upon contact with the lower bend of the first ribbon.

In this coupling step, the upper rods 14 in practice press the first ribbon onto the second ribbon, thus facilitating the coupling to the second ribbon, which is flat.

Proximate to the end of the upper branch of the lower conveyor 11, the lower rods must be extracted from the cavities and therefore disengage from the two coupled ribbons, which as shown in the drawings, assume a configuration that forms a plurality of cavities.

The rods 24 remain retracted within the corresponding cylinders 23 until they arrive proximate to the end of the lower branch of the lower conveyor, in which the rods are extracted from the cylinders and arrange themselves so that they can lie below the first ribbon and above the second ribbon.

With the arrangement described above, therefore, a machine can be obtained that is capable of continuously and automatically joining one another two ribbons of expanded plastic material, one of which is corrugated so as to obtain, between the first and second ribbons, a plurality of side-by-side cavities, which allow to reduce the weight of the resulting article and to provide in practice a plurality of chambers that form a valid barrier both for soundproofing and for thermal insulation.

Figure 1:
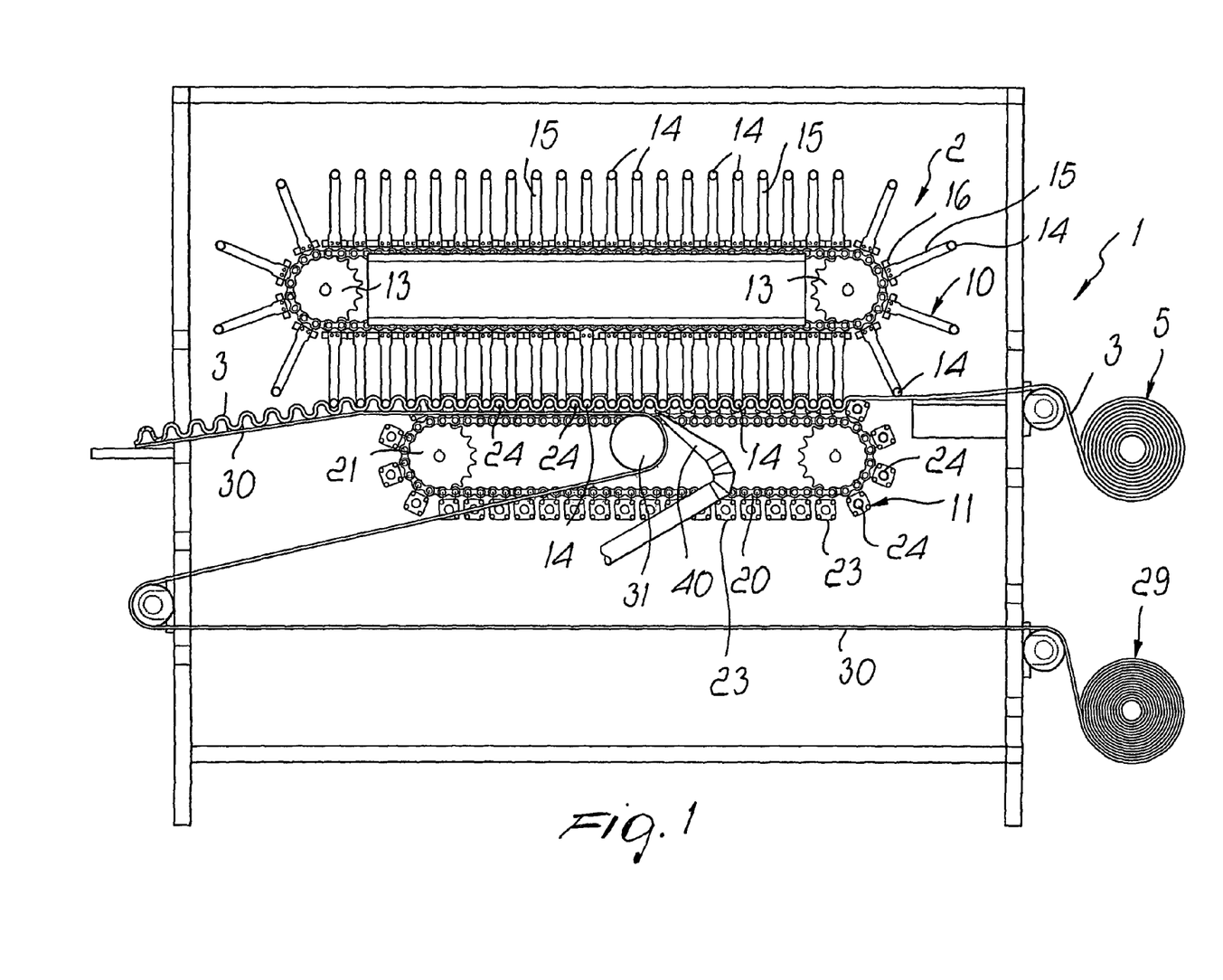
FIG. 1 is a schematic elevation view of the automatic machine.
Figure 2:
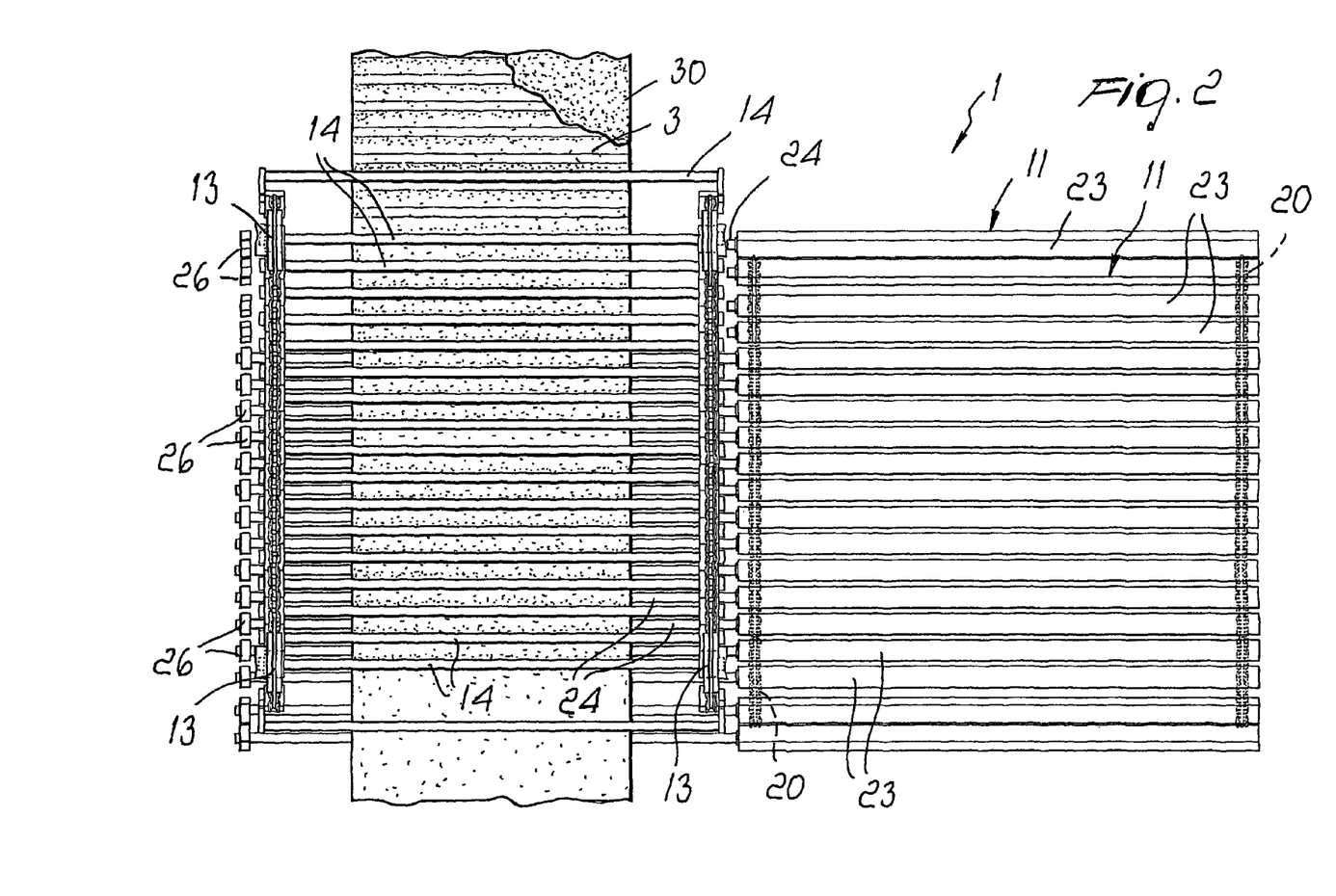
FIG. 2 is a schematic plan view of the automatic machine.
Figure 3:
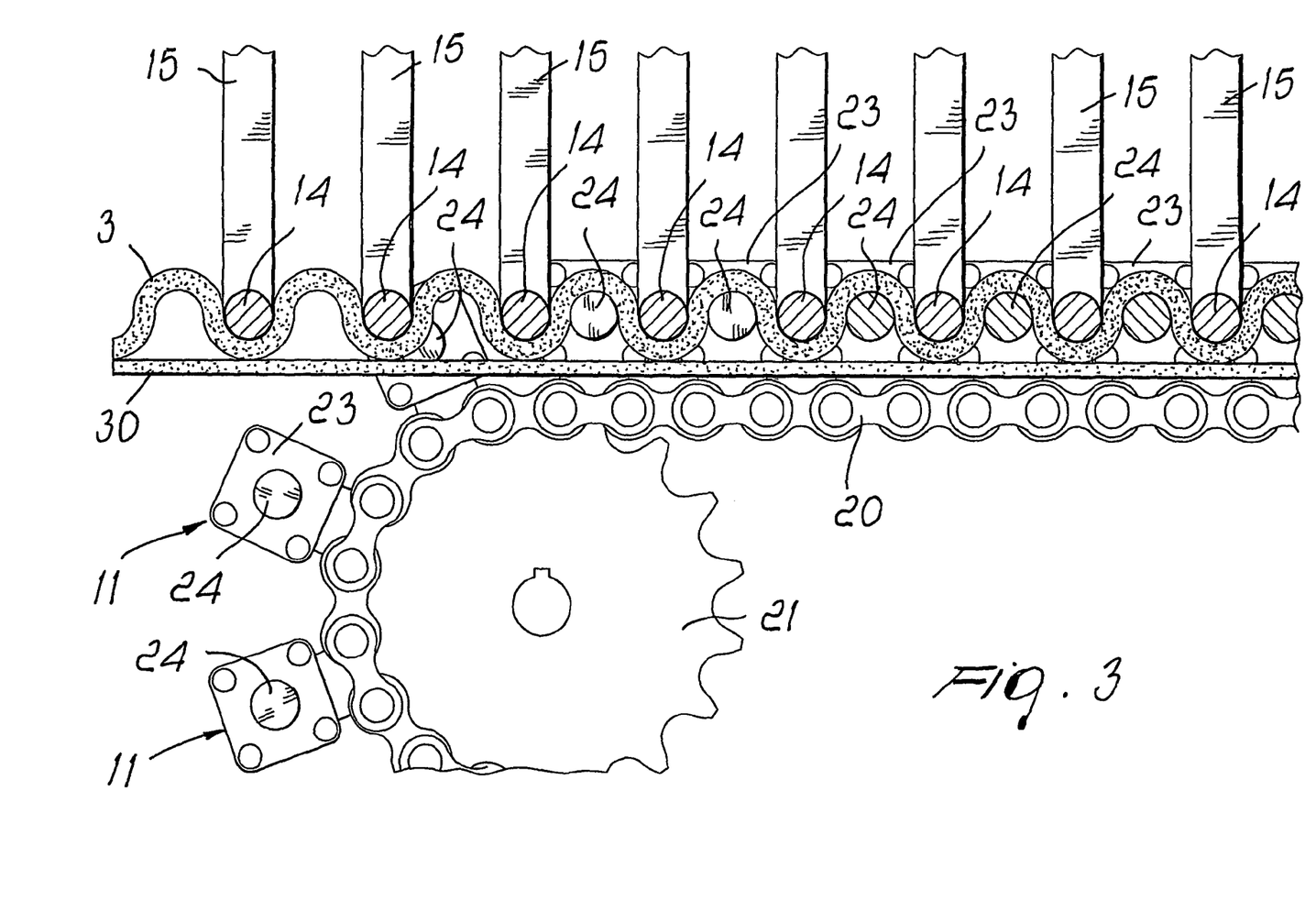
FIG. 3 is an elevation view of a detail of the means for continuously corrugating the first ribbon.
Figure 4:
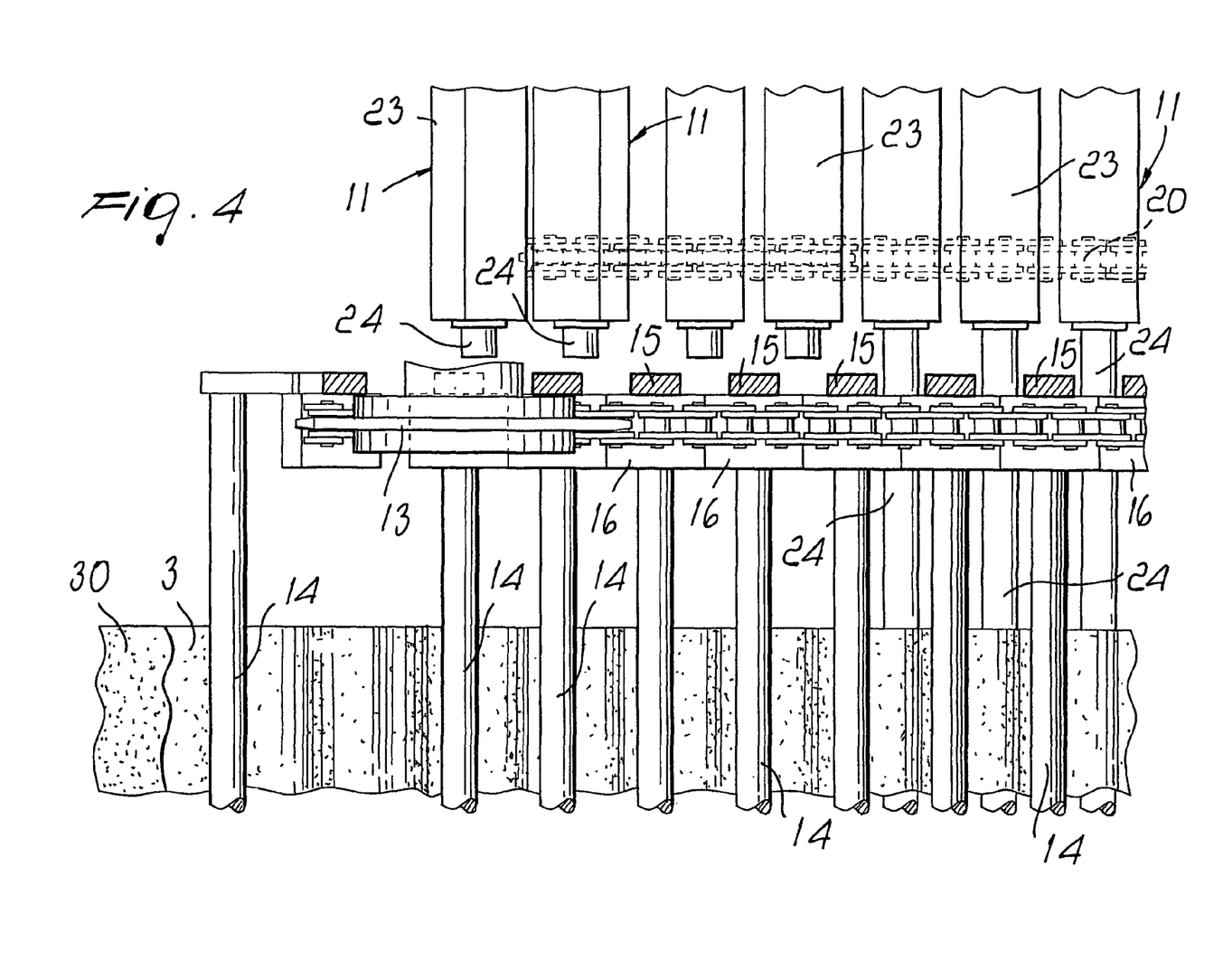
FIG. 4 is a plan view of the end part of the means for continuously corrugating the first ribbon.
Figure 5:
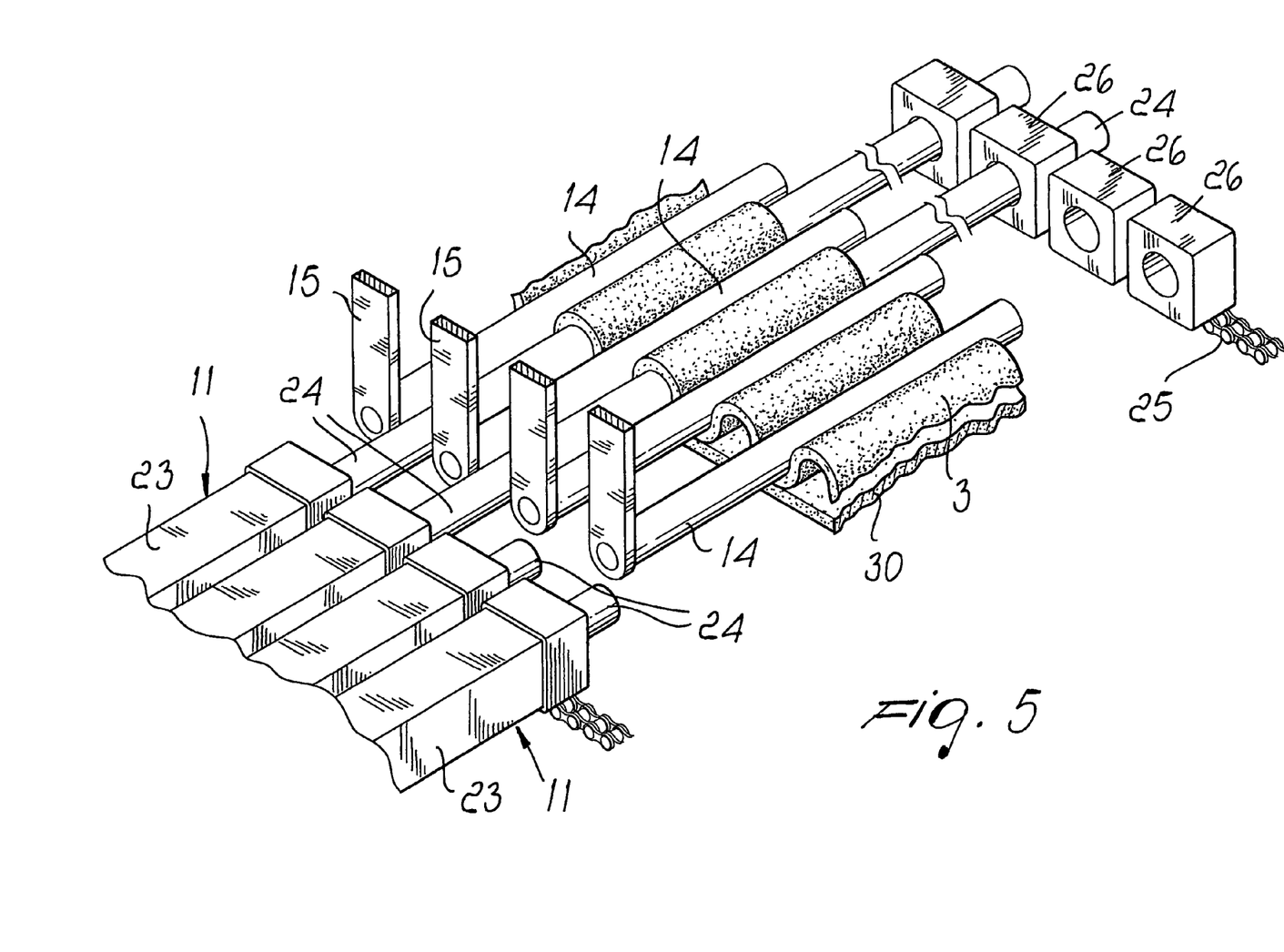
FIG. 5 is a perspective view of the end part of the means for continuously corrugating a ribbon.
Figure 6:
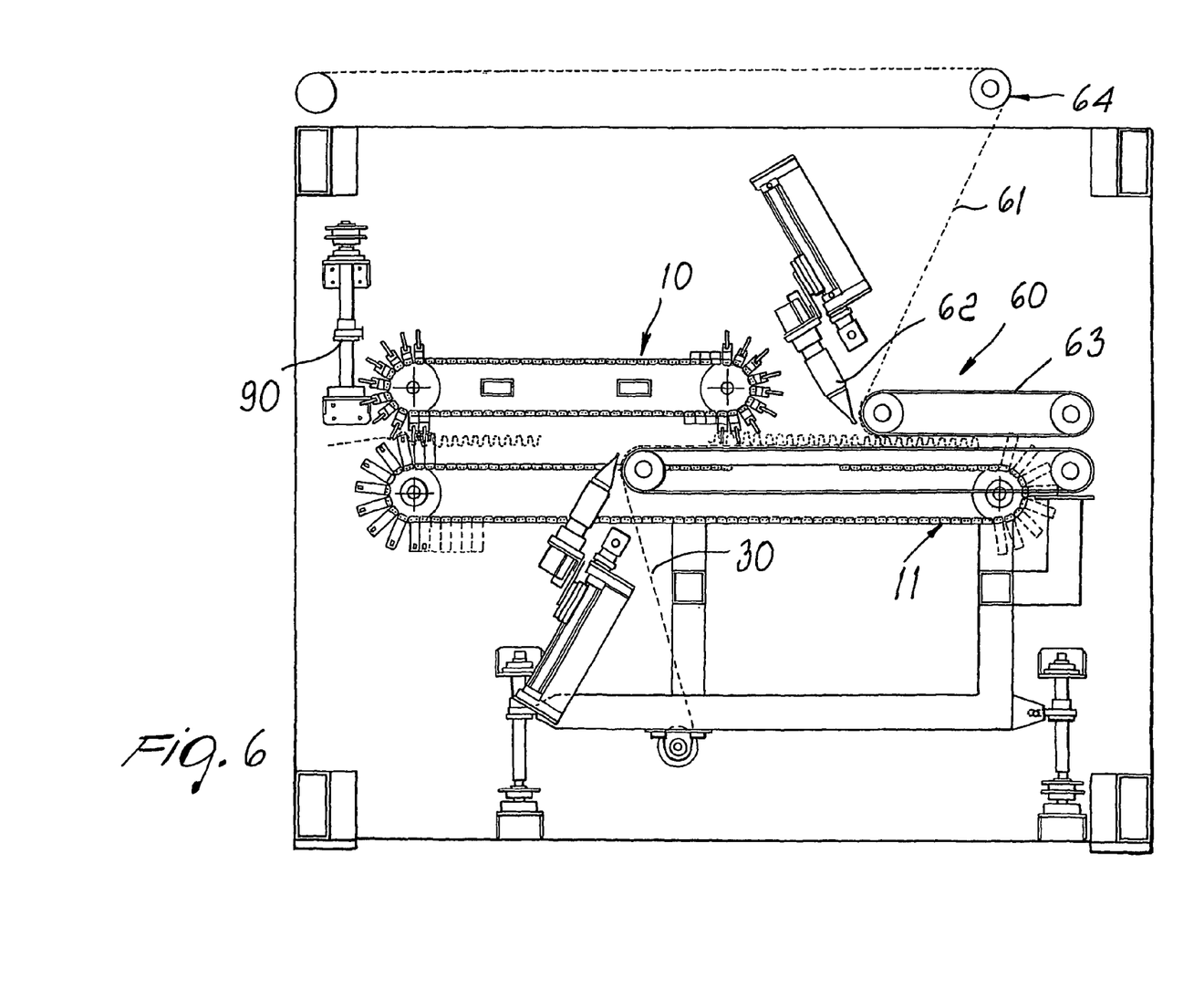
FIG. 6 is a schematic view of another embodiment of the machine, with the application of a flat ribbon on both sides.

According to what is shown in FIG. 6, another embodiment of the machine is provided which, together with the same components described earlier for coupling the first and second ribbons, has a station 60 for coupling an additional flat ribbon 61, obviously on the opposite side with respect to the side provided with the second ribbon 30.

For this purpose, a second hot air blower 62 is provided, which produces a localized melting of the additional ribbon 61 in order to achieve coupling to the corrugated ribbon 3 at a coupling ribbon 63 that lies above the article being produced and is arranged along the extension of the upper conveyor 10.

Advantageously, over a certain extent, the rods 24 are left within the bends so as to facilitate dimensional stability during coupling and are then extracted in order to allow separation by extracting the rods at the upper end branch of the lower conveyor, which in this case is extended with respect to the upper conveyor.

Figure 7:
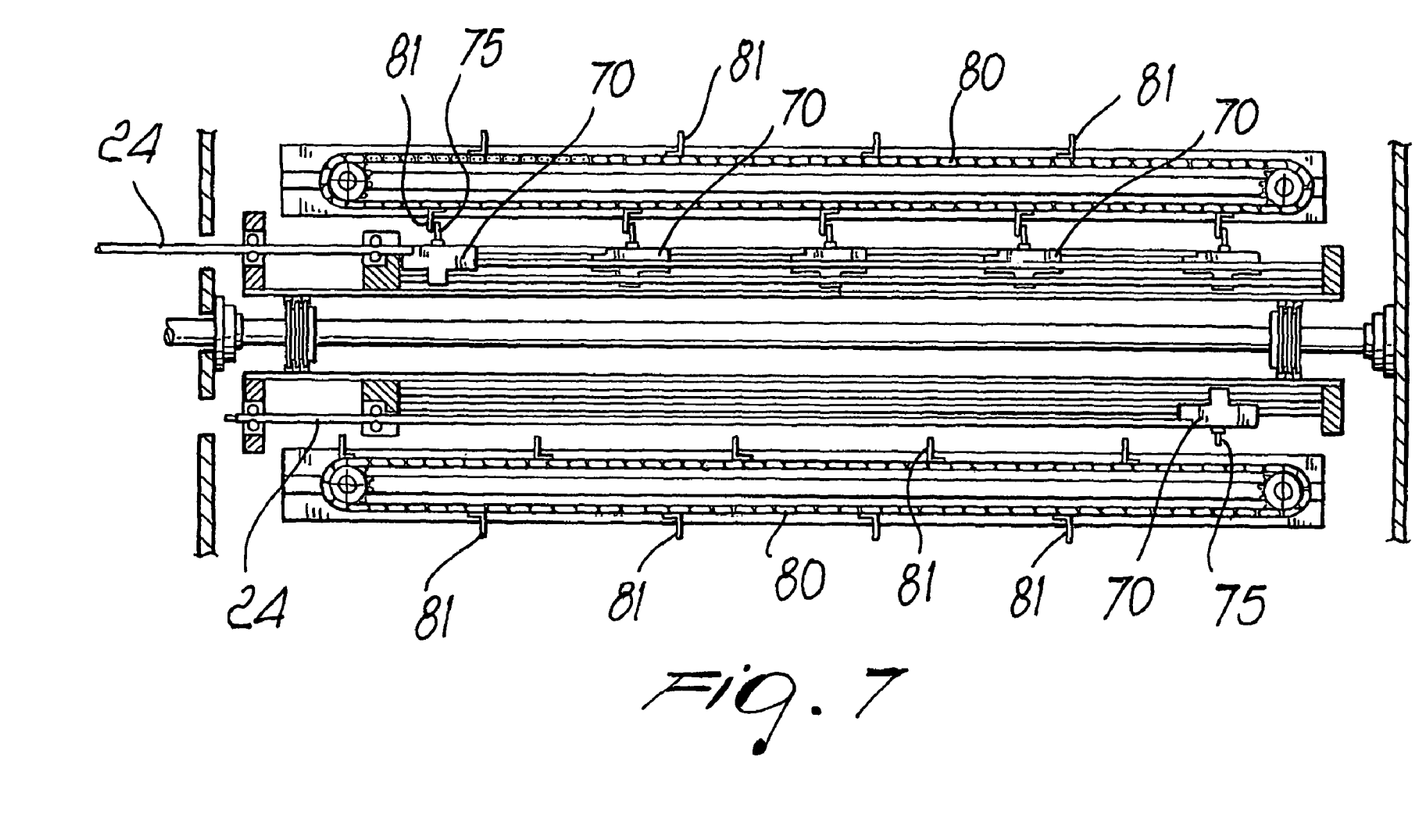
FIG. 7 is an elevation view of different means for actuating the lower bars.
Figure 8:
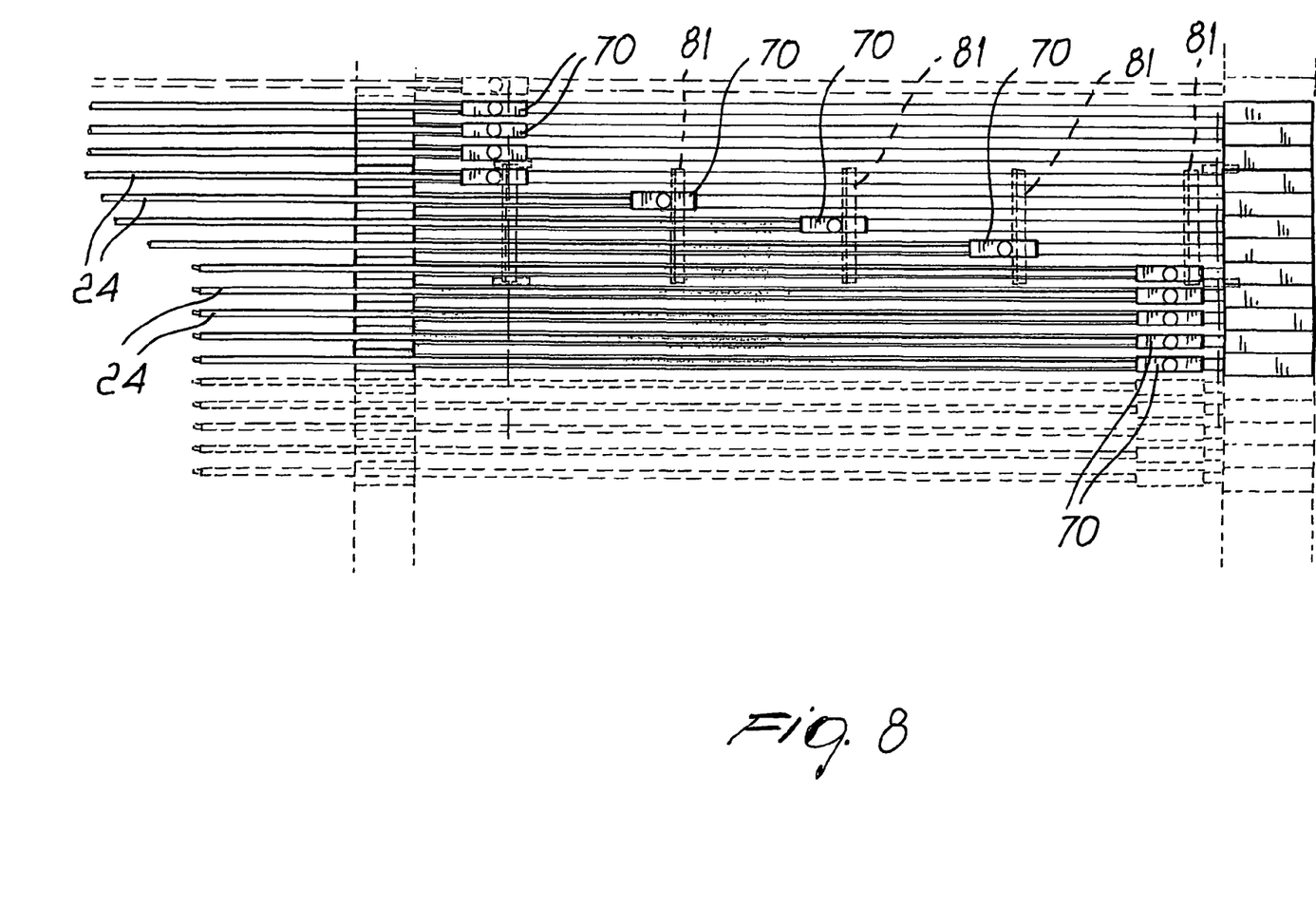
FIG. 8 is a schematic bottom view of the means for actuating the lower bars upon insertion of the bars between the ribbons.

Advantageously, as shown more clearly in FIGS. 7 to 8, different means are provided for the actuation of the rods 24, such means being constituted by carriages 70 that can move in a direction that is substantially parallel to the advancement of the rods and are supported by two guiding bars 71, which move in step with the lower conveyor so as to allow the insertion and extraction of the rods in the intended manner.

In order to move the rods 24, above the carriages 70, which are provided with engagement pins 75, there are actuation conveyors 80, which are provided with flaps 81 that are uniformly spaced, move in the direction of motion of the rods 24, and engage in succession the pins 75 so as to provide, in the intended spaces, the translational motion of the rods 24, which are made to enter and exit the bends formed by the ribbon being corrugated.

The provided arrangement allows to achieve rapid movement with very simple means.

Advantageously, said actuation means or conveyors 80 are provided at the end portion of the upper branch of the lower conveyor, where extraction is performed, and at the lower portion of the lower branch of the lower conveyor, where insertion is performed.

The machine also allows to vary at will the breadth of the bends of the ribbon being corrugated, and for this purpose distance variation means 90 are provided that allow to modify at will the mutual distance between the lower conveyor 11 and the upper conveyor 10.

Figure 9:
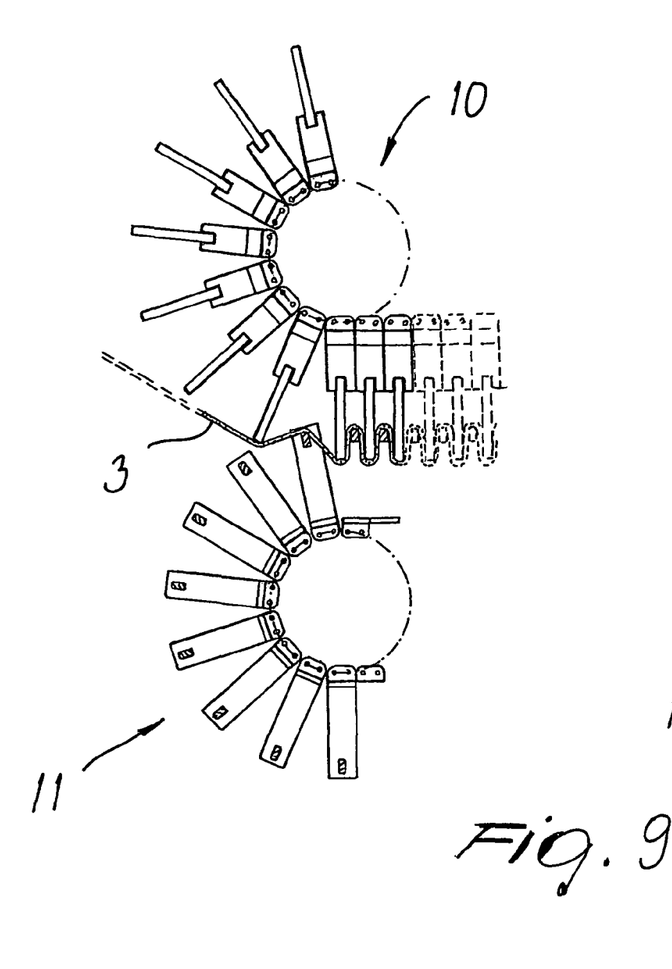
FIGS. 9 and 10 are views of two different possible couplings between the upper conveyor and the lower conveyor for providing a different type of corrugation.
Figure 10:
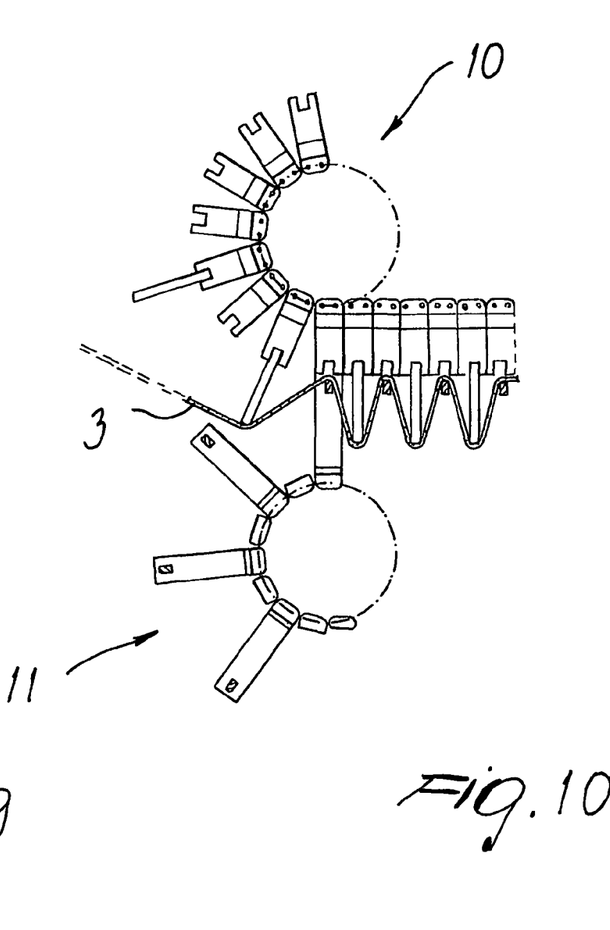

As shown in FIGS. 9 and 10, it is also possible to change at will the mutual spacing between the rods, so as to be able to vary, according to the manufacturing requirements, both the dimensions and the spacing of the bends provided on the corrugated ribbon 10.

It should be noted, and it is a very important aspect, that the machine described above allows to continuously provide a ribbon in which the corrugated layer is obtained by continuously undulating a flat sheet, with bends that lie substantially at right angles to the direction of extension of the ribbon; moreover, the bends are connected in discrete regions to at least one other flat sheet.

Furthermore, the possibility to couple a plurality of ribbons in successive steps allows to obtain a very wide range of products that are always differentiated.

From what has been described above, it is therefore evident that the invention achieves the intended aim and objects, and in particular the fact is stressed that the machine described above allows to provide automatically and continuously the coupling of two or more ribbons of expanded plastic material, thus obtaining a manufactured article that is particularly practical and valid from a functional and commercial standpoint.

The invention thus conceived is susceptible of numerous modifications and variations, all of which are within the scope of the appended claims.

Several possible embodiments of the corrugated sheet-like element are illustrated with reference to FIGS. 11 to 19; said element is produced by using an apparatus of the type described above, which can have additional processing stations or in which a sheet-like element that has already been processed is inserted instead of one of the ribbons.

Figure 11:
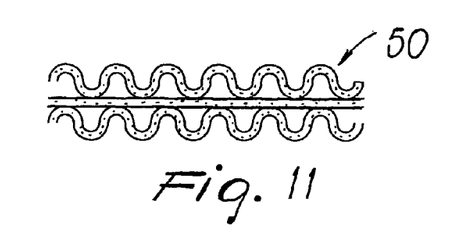
FIGS. 11 to 19 are views of further possible embodiments of a variously corrugated sheet-like element.

FIG. 11 illustrates a corrugated sheet-like element, designated by the reference numeral 50, in which an additional corrugated layer is inserted and is coupled to the flat ribbon, on one side of which a corrugated ribbon had already been provided.

Figure 12:
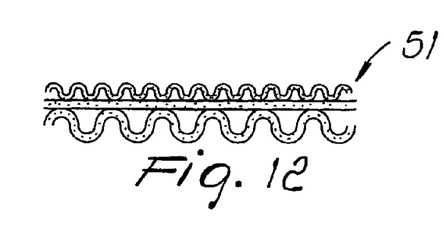

FIG. 12 is a view of a corrugated sheet-like element 51 in which, on the opposite sides of the flat ribbon, there are corrugated ribbons having different corrugation pitches.

Figure 13:
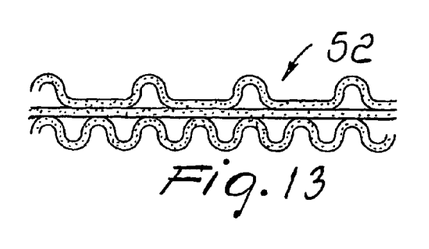

In FIG. 13, the sheet-like element 52 has corrugated elements connected to the sides of the flat ribbon; one of said corrugated elements has an alternating pitch, i.e., a bend is formed between spaces in which, instead of the bend, contact is provided between the flat ribbon and the corrugated ribbon and covers an extent that corresponds to a spacing pitch, i.e., a region in which a corrugation could be provided.

Figure 14:
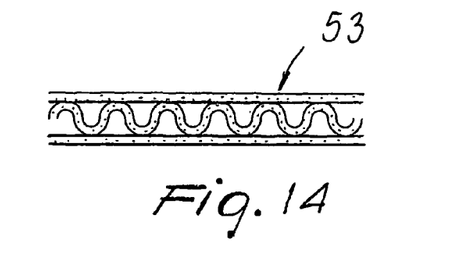

In FIG. 14, the sheet-like element 53 is provided by means of two flat ribbons, between which a corrugated ribbon is arranged.

Figure 15:
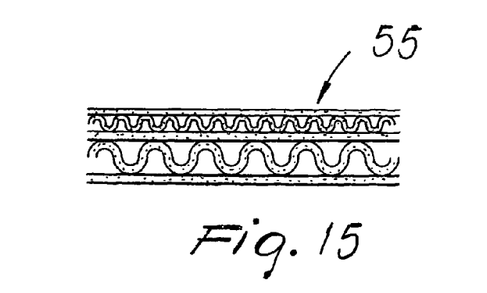
Figure 16:
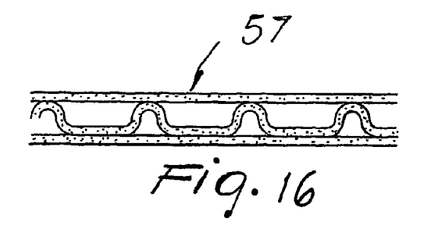

FIG. 15 is a view of a sheet-like element 54 in which there is an alternation of corrugated ribbons and flat ribbons; the sheet-like element 55 of FIG. 16 also has an alternation of corrugated ribbons and flat ribbons, with corrugated ribbons that have different spacing pitches and widths.

Figure 17:
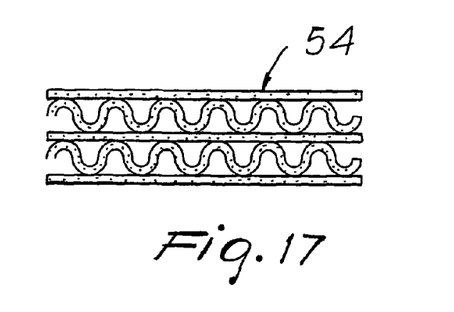
Figure 18:
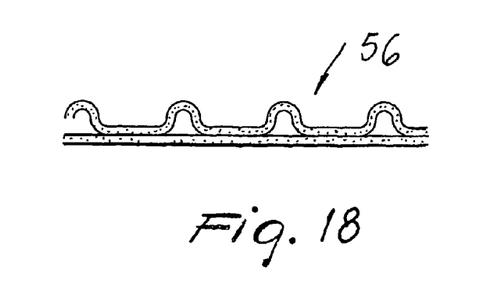

In FIG. 17, the sheet-like element 56 is provided by coupling to the flat ribbon a corrugated ribbon with alternating pitch; FIG. 18 instead illustrates a sheet-like element 57 in which a corrugated ribbon with alternating pitch is provided between two flat ribbons.

Figure 19:
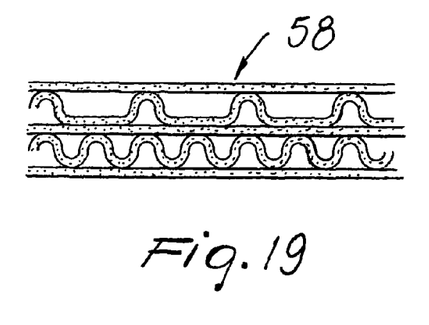

FIG. 19 is a view of the sheet-like element 58, in which there are flat ribbons between which different types of corrugated ribbon, such as for example a corrugated ribbon with uniform pitch and a corrugated ribbon with alternating pitch, are alternated.

The articles described above can be produced by providing additional stations on the machine described above, or it is possible to use the same type of machine, in which a manufactured article is fed which is constituted by the coupling of a plurality of previously provided ribbons, so as to obtain the chosen combination.

All the details may further be replaced with other technically equivalent elements, and individual characteristics given in relation to specific examples may actually be interchanged with other different characteristics that exist in other examples of embodiments.

In practice, the materials used, so long as they are compatible with the specific use, as well as the contingent shapes and dimensions, may be any according to requirements.

The disclosures in Italian Patent Application No. MI2003A000930 from which this application claims priority are incorporated herein by reference.

The invention claimed is:

1. An automatic machine for producing corrugated sheet with at least a first ribbon and a second ribbon, comprising:
   corrugating means for continuously corrugating said first ribbon that moves longitudinally;
   feeding means for feeding together said second ribbon with said first ribbon; and
   joining means for mutually joining said first and second ribbons in discrete regions;
   said corrugating means for continuously corrugating said first ribbon comprising a reel for dispensing the first ribbon, an upper conveyor and a lower conveyor, said first ribbon being dispensed for insertion between said upper and lower conveyors, said upper conveyor having a plurality of upper rods and said lower conveyor having a plurality of lower rods, said upper rods being arrangeable so as to be intercalated between the lower rods;
   said upper conveyor comprising a continuous upper chain and a plurality of said upper rods, which are supported by lateral arms that protrude from coupling blocks, said coupling blocks being associated with linkc of said continuous upper chain, said arms being arranged substantially at right angles to an orientation direction of said chain;
   said lower conveyor having a lower chain to which the plurality of said lower rods is connected, and actuation means for actuation of said lower rods;
   the machine further comprising an auxiliary chain that is movable in step with said lower chain and is provided with a plurality of guiding elements that are adapted to engage an end of said lower rods in a position in which the lower rods are extracted from said actuation means, said actuation means comprising cylinders.

2. The automatic machine of claim 1, wherein said lower rods are movable along directions that are substantially parallel to a direction of said upper rods and are substantially perpendicular to an advancement direction of said conveyors.

3. The automatic machine of claim 1, wherein a lower branch of said upper conveyor intersects an upper branch of said lower conveyor in order to arrange said upper rods and said lower rods so that they are mutually alternated.

4. The automatic machine of claim 3, wherein said feeding means for feeding together the second ribbon with said first ribbon comprise a coupling roller and a reel for dispensing the second ribbon that winds onto the coupling roller that is arranged proximate to the upper branch of said lower conveyor below said lower rods.

5. The automatic machine of claim 1, wherein said joining means for mutually joining said first ribbon and said second ribbon in discrete regions comprises a hot air blower, which acts between said at first ribbon and said second ribbon before a coupling between said second ribbon and lower bends of said first ribbon is performed.

6. The automatic machine of claim 5, wherein said lower rods are accommodated in cavities formed between said first ribbon and said second ribbon and are adapted to be extracted from said cavities proximate to an end of said upper branch of the lower conveyor.

7. The automatic machine of claim 6, wherein said lower rods are extracted from said cylinders proximate to an end of the lower branch of said upper conveyor.

8. The automatic machine of claim 1, further comprising introducer means for introducing an additional ribbon with a longitudinal motion, and additional corrugation means for corrugation of said additional ribbon.

9. The automatic machine of claim 8, further comprising feeding means for feeding an additional flat ribbon.

10. The automatic machine of claim 9, adapted to feed a corrugated sheet element produced previously for coupling to the additional flat ribbon.

11. The automatic machine of claim 10, comprising a coupling station located at the end of said upper conveyor for coupling the additional flat ribbon on a side that lies opposite the one provided with said second ribbon.

12. The automatic machine of claim 10, comprising a second hot air blower that acts between said additional flat ribbon and the corrugated sheet element that exits from said upper conveyor.

13. The machine of claim 1, comprising said actuation means for the actuation of said lower rods at the end of the upper branch of said lower conveyor.

14. The automatic machine of claim 13, wherein said rod actuation means comprise carriages that are movable along directions that are substantially parallel to an advancement of said rods, two guiding bars that support said carriages and are movable in step with said lower conveyor for insertion and extraction of said rods respectively at the end of the lower branch and at the end of the upper branch of said lower conveyor.

15. The automatic machine of claim 13, comprising pins located above said carriages for engaging an actuation conveyor, which is provided with flaps that are uniformly spaced and move in the direction of motion of said lower rods, said flaps engaging in succession pins, for translational motion of said lower rods in a direction for insertion and extraction with respect to the corrugated ribbon being formed.

16. The automatic machine of claim 1, comprising bend variation means for mutually varying the distance between said lower conveyor and said upper conveyor in order to change a breadth of bends being provided on said first ribbon.

* * * * *